United States Patent [19]

Lee et al.

[11] 4,193,618

[45] Mar. 18, 1980

[54] LATCH MECHANISM FOR REMOVABLE ROOF CLOSURE

[75] Inventors: Charles H. Lee, Almont; Harry H. Fetters, Royal Oak, both of Mich.

[73] Assignee: General Motors Corporation, Detroit, Mich.

[21] Appl. No.: 859,289

[22] Filed: Dec. 12, 1977

[51] Int. Cl.² .......................... E05C 9/04; E05C 5/00
[52] U.S. Cl. .......................................... 292/7; 49/465; 292/35; 292/39; 292/DIG. 5; 292/DIG. 55; 296/137 B
[58] Field of Search .................... 292/7, 36, 39, 33, 22, 292/35, DIG. 5, DIG. 55, DIG. 51; 49/465; 98/2.14; 296/137 B, 137 H

[56] References Cited

U.S. PATENT DOCUMENTS

| | | | |
|---|---|---|---|
| 1,536,773 | 5/1925 | Ciaccio | 70/240 |
| 1,712,792 | 5/1929 | Hansen | 292/7 |
| 1,817,241 | 8/1931 | Dewbery | 292/39 |
| 2,055,289 | 9/1936 | Hanan | 70/14 |
| 2,218,257 | 10/1940 | Bulat | 292/28 |
| 2,242,844 | 5/1941 | Baier et al. | 292/8 |
| 2,309,437 | 1/1943 | Blodgett | 292/DIG. 51 X |
| 2,556,062 | 6/1951 | Buehrig | 296/137 B |
| 2,560,459 | 7/1951 | Lundberg et al. | 292/DIG. 5 X |
| 2,570,260 | 10/1951 | Milhan | 292/DIG. 5 X |
| 2,674,480 | 4/1954 | Vigmostad | 292/7 |

FOREIGN PATENT DOCUMENTS

| | | | |
|---|---|---|---|
| 179232 | 7/1954 | Austria | 292/39 |
| 901509 | 1/1954 | Fed. Rep. of Germany | 292/36 |
| 1239858 | 11/1959 | France | 292/39 |
| 11674 | of 1908 | United Kingdom | 292/39 |

OTHER PUBLICATIONS

1976 Oldsmobile Hatch Roof Service Manual.

*Primary Examiner*—William E. Lyddane
*Attorney, Agent, or Firm*—Charles E. Leahy

[57] ABSTRACT

Valve means associatable with free traveling spherical means are sealing engageable onto and wipable off of companion seats to selectively control flow. A spool permits selective movement of the head means to the seat means and selective engagement of the head and seat means upon shuttling.

An interface assembly comprises means which are extendible to the spool and a piston head element within the housing and carried around an extension for travel along the extension in response to pressure variation. The piston head is shiftable in a first direction in response to fluid variation for travel along the extension for transfer of the spherical means within the piston from one camway to another camway without movement of the spool within the housing. The piston head is shiftable in a second direction in response to second pressure variation for interface with the spherical elements carried in the piston with a shoulder and carriage of the spool to shift the spool to another position to vary the fluid flow path through the spool valve.

The apparatus may be used to manipulate, for example, a downhole safety valve between open and closed position in response to signal variation indicating abnormal well flow, or the like.

4 Claims, 7 Drawing Figures

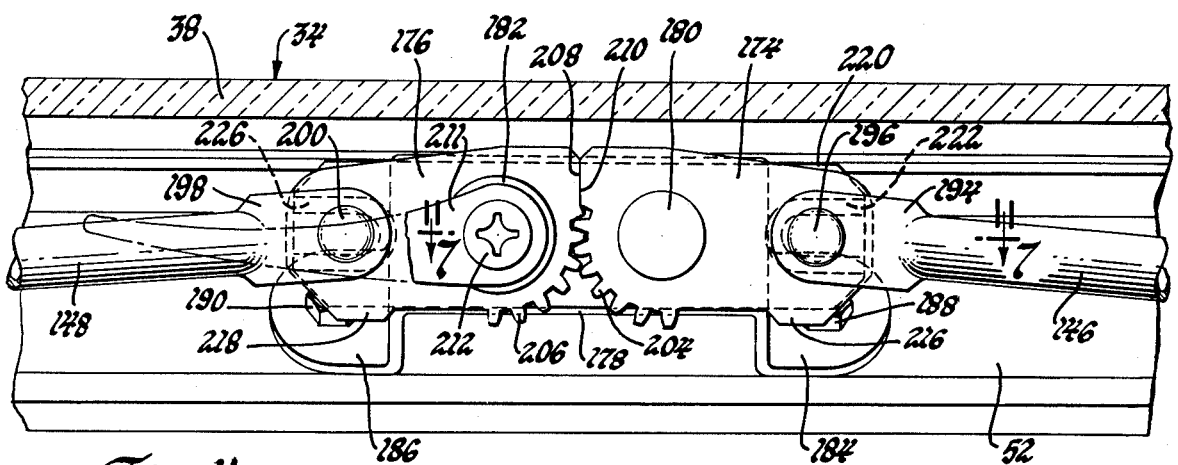
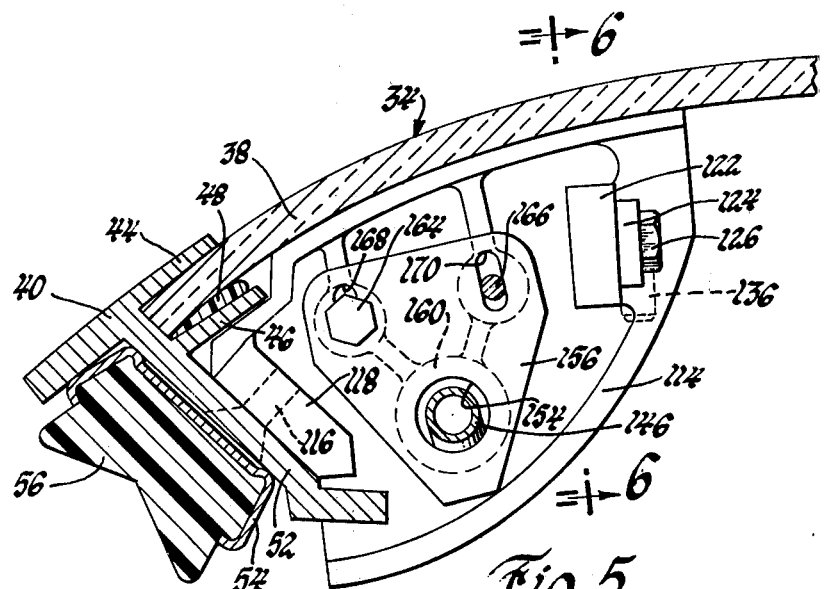
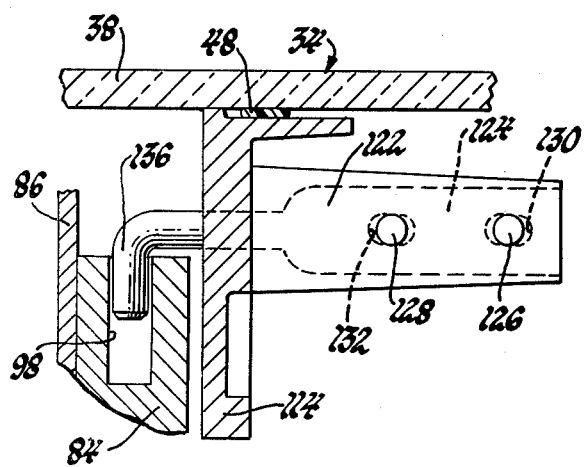
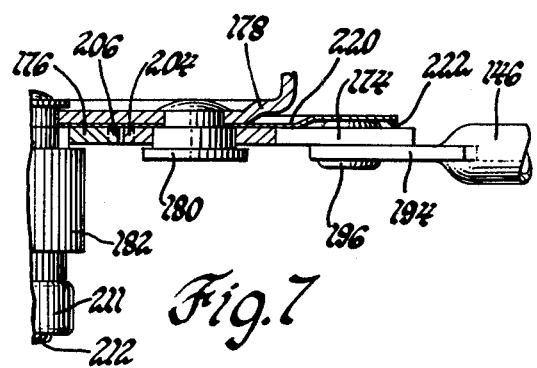

LATCH MECHANISM FOR REMOVABLE ROOF CLOSURE

The invention relates to a latch mechanism and more particularly to an improved latch mechanism for securing a removable roof closure panel in a vehicle body roof opening.

It is well known in automotive vehicle bodies to provide a roof opening having a removable closure panel. One such well known removable roof structure is shown in U.S. Pat. No. 2,556,062, issued to G. M. Buehrig on June 5, 1951, and includes a central spine or backbone which extends from the fixed rearward roof portion to the windshield header to stiffen the vehicle roof structure and define an opening over the driver and over the front seat passenger. The doors of the vehicle are preferably of the type having a frameless window so that the occupant enjoys openness to the side and above when the windows are rolled down. The inboard portion of each closure panel is retained in the roof opening by mating male/female connectors provided respectively on the central spine of the roof and on the removable closure panel. The outboard portion of the removable closure panel is attached to the vehicle body roof structure by a pair of sliding bolts engageable with receptacles on the rearward roof portion and on the windshield header.

It is also known to provide convertible folding tops having a latch mechanism including a pair of latch bolts which are thrown outwardly relative one another by a central control handle for respective engagement with a pair of spaced apart keepers. U.S. Pat. No. 2,570,260, issued to L. D. Milhan on Oct. 9, 1951, is typical as such latch mechanisms and has the latch bolts pivotally connected to the opposite ends of a plate or the like which has its central portion pivoted for 90° of rotation to withdraw and extend the latch bolts.

It would be desirable to adapt the aforedescribed central control handle latch mechanism of Milhan to removable closure panels of the Buehrig type. However, the use of a centrally pivoted plate having latch bolts mounted on diametrically opposed ends thereof results in a mechanism having a height of at least twice the throw of the bolts. The application of such a mechanism in the outboard portion of the Buehrig type removable closure panel intrudes excessively into the passenger compartment and also obstructs the passage of light into the passenger compartment in those instances where the panel is of glass or similar transparent material.

According to the present invention, first and second keepers are mounted on the vehicle body at the opposite sides of the roof opening. First and second latch bolts are movably mounted on the closure panel and have first end portions adapted for latching engagement with the keepers upon extension away from one another and unlatching disengagement from the keepers upon retraction toward one another. First and second operating levers have their first ends pivotally mounted on the closure panel for movement about spaced axes and have second ends respectively pivotally connected with second end portions of the first and second latch bolts to extend and retract the first ends of the latch bolts upon rotation of the operating levers. Interengaging gear teeth are provided on the first and second operating levers to simultaneously rotate the second operating lever upon rotation of the first operating lever by a handle associated therewith. The operating levers rotate oppositely of each other to their respective latching positions wherein the two operating levers are positioned generally colinear with each other and with the latch bolts to effect extension of the first ends of the latch bolts and latching engagement thereof with their respective keepers. The levers are rotated through 90° of rotation from their latching positions to their respective unlatching positions wherein the operating levers are located generally parallel to one another and normal to their respective latch bolts to effect retraction of the latch bolts and unlatching disengagement of their first ends from the respective keepers. The keepers are mounted for transverse adjusting movement to align with the latch bolts. The latch bolts are vertically aligned with the keepers by vertically adjustable plates on the closure panel. Locating hook members are mounted on the closure panel and engageable with the keepers to transversely align the latch bolts with the keepers and are longitudinally adjustable to adjust the longitudinal location of the closure panel in the vehicle body roof opening.

These and other objects, features and advantages of the invention will become apparent upon consideration of the appended specification and the drawings in which:

FIG. 4 is a sectional view taken in the direction of arrows 4—4 of FIG. 3;

FIG. 5 is a sectional view taken in the direction of arrows 5—5 of FIG. 2;

FIG. 6 is a sectional view taken in the direction of arrows 6—6 of FIG. 5; and

FIG. 7 is a sectional view taken in the direction of arrows 7—7 of FIG. 4.

Figure 1:
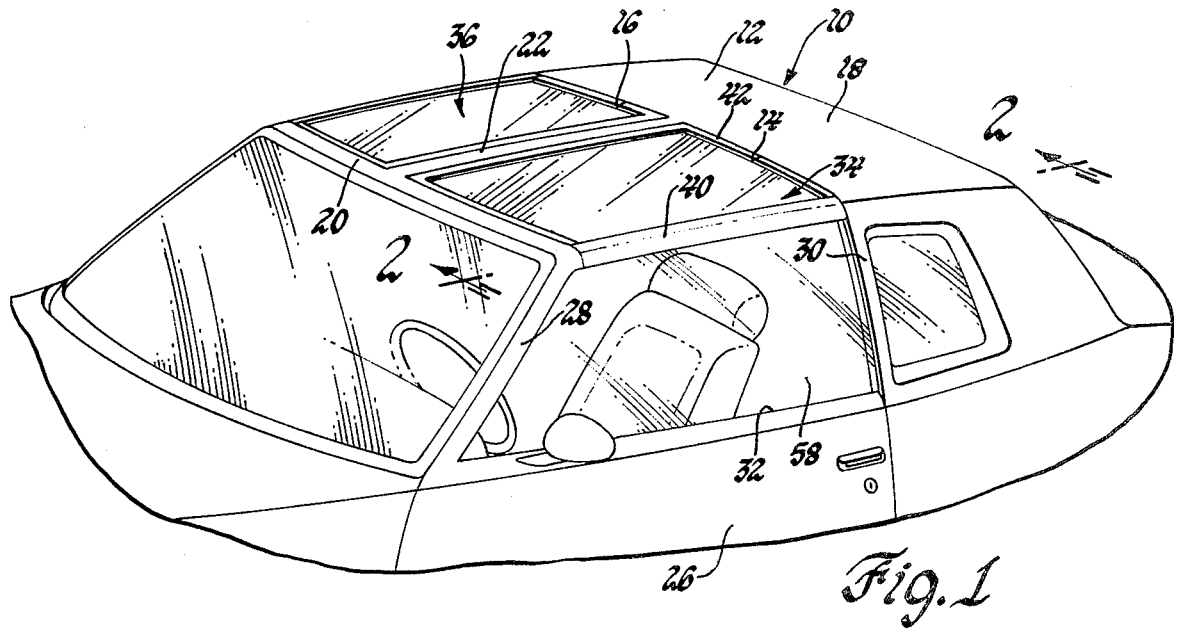
FIG. 1 is a partial perspective view of a vehicle body having removable roof closure panels.

Referring to FIG. 1, it is seen that a vehicle body 10 includes a roof structure 12 having a roof opening 14 located generally above the driver's seat and a roof opening 16 located generally above the passenger's seat. The roof opening 14 is defined by a fixed rearward roof portion 18, a windshield header 20 and a central spine 22 which extends between the fixed rearward roof portion 18 and the windshield header 20. The driver's door 26 cooperates with the windshield pillar 28 and rear pillar 30 to define a window opening 32 which communicates with the roof opening 14 so that the driver enjoys open space to the side and above. A removable roof closure panel 34 is provided to close the roof opening 14. A like closure panel 36 is provided to close the roof opening 16.

Figure 2:
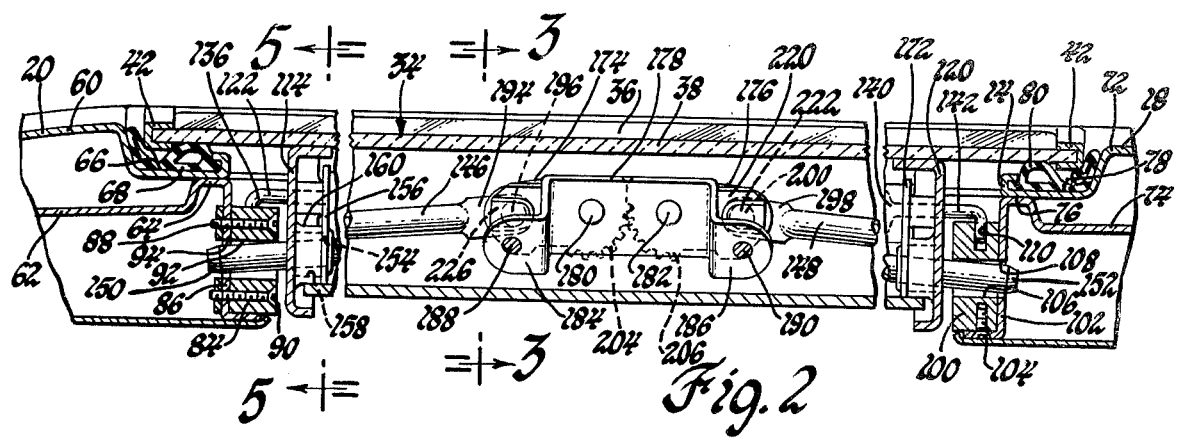
FIG. 2 is a sectional view taken in the direction of arrows 2—2 of FIG. 1.
Figure 3:
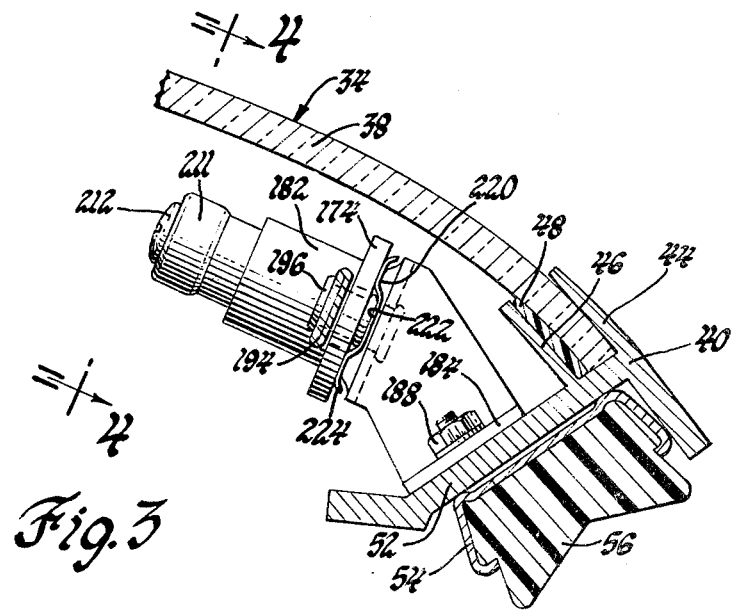
FIG. 3 is a sectional view taken in the direction of arrows 3—3 of FIG. 2.

Referring to FIGS. 2 and 3, it is seen that the closure panel 34 is generally comprised of a transparent panel 38 having a support channel 40 along its outboard edge and a C-shaped channel 42 surrounding its forward, rearward and inboard edges. As best seen in FIG. 3, the support channel 40 is preferably of extruded aluminum and includes spaced apart walls 44 and 46 forming a C-shaped channel to receive the edge of the transparent panel 38. A bead of urethane sealant 48 is disposed between the transparent panel 38 and wall 46.

Support channel 40 also has a wall 52 to which a carrier 54 and associated weatherstrip 56 are attached. When the closure panel 34 is installed on the vehicle body to close the roof opening 14, the support channel 40 extends longitudinally of the vehicle between the fixed rearward roof portion 18 and the windshield header portion 20. The side window 58 of the door 26 seats against the weatherstrip 56.

Referring to FIG. 2, it is seen that the windshield header portion 20 of the vehicle roof 12 includes an outer panel 60 and an inner panel 62 which are suitably welded together at 64. The outer panel 60 has a channel portion 66 which seats a seal 68 for engagement by the closure panel 36. The fixed roof portion 18 includes an outer panel 72 and an inner panel 74 suitably welded together at 76. The outer panel 72 defines a channel 78 which seats a seal 80 upon which the closure panel 36 rests. The central spine 22 of the roof includes similar inner and outer panels and seats a similar weatherstrip for supporting the inboard portion of the closure panel 34.

Mating male and female connectors, not shown in the drawings, are provided between the central spine 22 and the channel 42 at the inboard portion of the closure panel 36. These connectors are interengaged during transverse sliding movement of the closure panel 34 into the roof opening 14 to retain the inboard portion of the closure panel 34 on the roof structure 12.

Referring to FIG. 2, it is seen that the latch mechanism for maintaining the closure panel 34 in its closed position includes a keeper 84 which is attached to a downwardly depending flange structure 86 of the windshield header inner panel 62 by screw and nut assemblies 88 and 90. The flange structure 86 has slotted holes for screw and nut assembies 88 and 90 so that the keeper 84 may be adjusted transversely of the body. Keeper 84 has an aperture 92 which aligns with an aperture 94 of the flange structure 86 for receiving a latch bolt as will be discussed hereinafter. Referring to FIG. 6, it is seen that the keeper 84 also has an upwardly opening recess 98.

A keeper 100 is provided at the rearward end of roof opening 14 and is attached to a flange structure 102 of the roof inner panel 74 by a screw 104. The flange structure 102 is slotted so that the position of keeper 100 may be adjusted in the transverse direction. Keeper 100 has an aperture 106 which aligns with an aperture 108 of the flange structure 102 for receiving a latch bolt as will be discussed hereinafter. Keeper 100 also has an upwardly opening recess 110.

Referring to FIGS. 2 and 5, it is seen that a die case end plate 114 is attached to the forward end of support channel 40 by screws 116 extending between wall 52 and an abutment 118 of the end plate 114. A like end plate 120 is attached to the rearward end of support channel 40.

Referring to FIGS. 5 and 6, a locating hook member 124 is attached to an extension 122 of end plate 114 by screws 126 and 128 which extend through elongated bolt holes 130 and 132 so that the hook member 124 may be adjusted fore and aft. The hook member 124 has a downwardly directed hook 136, best seen in FIGS. 2 and 6, which is received in the opening 98 of keeper 84 to locate the closure panel 34 in the transverse and longitudinal directions.

Referring to FIG. 2, it is seen that a like hook member 140 is attached to the support channel 40 at the rearward portion of the roof opening and has a downwardly directed hook 142 which extends into the upwardly opening recess 110 of keeper 100 to similarly locate the rearward portion of closure panel 34.

A pair of latch bolts 146 and 148, FIG. 2, extends from the closure panel 34 into the respective apertures 92 and 106 of kepers 84 and 100 to latch the closure panel 34 within the roof opening 14. The ends of the latch bolts 146 and 148 are respectively tapered at 150 and 152 to facilitate their entry into the keeper apertures 92 and 106. As best seen in FIGS. 2 and 5, the latch bolt 146 is slidably guided in a flanged guide aperture 154 of an adjusting plate 156 which is adjustably aligned with an oversize clearance aperture 158 provided in a cylindrical abutment 160 of the end plate 114. The adjusting plate 156 seats on the abutment 160 and is attached to the end plate 114 by a pair of bolts 164 and 166 which respectively extend through vertically elongated slots 168 and 170 of the adjusting plate 156. A like adjusting plate 172 is adjustably attached to the rearward end plate 120 and slidably guides the latch bolt 148.

An operating mechanism is provided for simultaneously moving the latch bolts 146 and 148 between their extended latching positions shown in FIG. 2 and retracted unlatching positions permitting removal of the closure panel 34. Referring to FIGS. 2, 3 and 4, it is seen that the operating mechanism includes a pair of operating levers 174 and 176 which are respectively attached to a bracket 178 by pivot shafts 180 and 182. The bracket 178 has legs 184 and 186 which are respectively attached to the wall 52 of support channel 40 by bolt and nut assemblies 188 and 190. Referring to FIG. 3, the latch bolt 146 is a tube and has a flattened end 194 attached to the operating lever 174 by a pivot pin 196. The flattened end 198 of latch bolt 148 is likewise attached to its associated operating lever 176 by a pivot pin 200.

As best seen in FIG. 4, the operating levers 174 and 176 are respectively provided with intermeshing gear teeth 204 and 206 which are arcuate about the respective pivot shafts 180 and 182. The operating levers 174 and 176 have respective abutment faces 208 and 210 which engage one another as seen in FIG. 4 to limit the rotation of operating levers 174 and 176 at a position in which the operating levers are located generally colinear with each other and with the latch bolts 146 and 148 so that the latch bolts are extended to their furthest apart positions and engaged within the apertures 92 and 106 of their respectively associated keepers 84 and 100. The engagement of abutment faces 208 and 210 prevent the operating levers 174 and 176 from striking the panel 38. As best seen in FIG. 4, a handle 211 is attached to the pivot shaft 182 by a screw 212 so that counterclockwise pivotal movement of the handle 211 as viewed in FIG. 4 rotates the operating lever 176 in the counterclockwise direction to retract and withdraw the latch bolt 148 from keeper 100. The intermeshing gear teeth 204 and 206 acting between the operating levers 174 and 176 causes the operating lever 174 to be simultaneously rotated in the clockwise direction of rotation about its pivot shaft 180 to retract the latch bolt 146 from engagement in the keeper 84. The operating levers 174 and 176 are provided with abutment faces 216 and 218 which become engaged with one another to limit the unlatching rotation of the operating levers at a position wherein the levers are located generally parallel to one another and normal to their respectively associated latch bolts. Upon such retraction and withdrawal of the latch bolts 146 and 148 from the keepers 84 and 100, the closure panel 34 may be lifted first vertically to disengage the hook members 136 and 142 from the keepers and may then be moved transversely of the vehicle body to disengage the mating male and female connectors provided between the central spine 22 and the channel 42 at the inboard portion of the closure panel 34.

Referring to FIGS. 3, 4 and 7, it is seen that a detent spring 220 is mounted between the bracket 178 and operating levers 174 and 176. The end of detent spring 220 adjacent latch bolt 146 has a central depression 222 which receives the head of pivot pin 196 to retain the operating lever 174 and latch bolt 146 in their latched positions. As best seen in FIG. 3, the detent spring 220 has a lead-in cam 224 which facilitates deflection of the detent spring 220 to receive the head of pivot pin 196 in the depression 222. The end of detent spring 220 adjacent the operating lever 176 and latch bolt 148 has a similar central depression 226 for yieldably capturing the head of pivot pin 200 to retain the latch bolt 148 in the latched position.

It will be understood that the installed position of the closure panel 34 may be adjusted transversely of the roof opening 14 by transverse adjustment of the keepers 84 and 100. Furthermore, the position of the closure panel may be adjusted in the vertical direction by vertical adjustment of the adjusting plates 156 and 172 to vary the extent of compressive interference of the closure panel with the seals 68 and 80 of the roof structure 12. Furthermore, it will be understood that the fore and aft location of the closure panel may be adjusted by fore and aft adjusting movement of the hook members 124 and 140.

Thus, it is seen that the invention provides a new and improved latch mechanism for a vehicle body removable roof closure panel.

The embodiments of the invention in which an exclusive property of privilege is claimed are defined as follows:

1. A latch mechanism for securing a removable roof closure panel in a vehicle body roof opening comprising:

first and second keepers mounted on the vehicle body at opposite sides of the roof opening;

first and second latch bolts movably mounted on the closure panel and having first end portions adapted for respective latching engagement with the keepers upon extension away from one another and unlatching disengagement from the keepers upon retraction toward one another;

first and second locating members mounted on the closure panel and respectively engageable with the first and second keepers to locate the closure panel longitudinally and transversely of the roof opening and transversely align the latch bolts with the keepers, said locating members being longitudinally adjustable on the closure panel to adjust the longitudinal position of the closure panel;

first and second operating levers having first ends pivotally mounted on the closure panel for movement about spaced axes and having second ends respectively pivotally connected with second end portions of the first and second latch bolts to extend and retract the latch bolts upon rotation of the operating levers;

means for rotating one of the levers;

and intermeshing gear teeth provided on the first and second operating levers to simultaneously rotate the second lever with the first lever, the levers rotating oppositely of each other between a latching position wherein the levers are located generally colinear with each other and with the latch bolts to effect extension of the latch bolts and latching engagement thereof with the respective keepers, and an unlatching position wherein the levers are located generally parallel to one another and normal to their respective latch bolts to effect retraction of the latch bolts and unlatching disengagement thereof from the respective keepers.

2. A latch mechanism for securing a removable roof closure panel in a vehicle body roof opening comprising:

first and second keepers mounted on the vehicle body at opposite sides of the roof opening;

first and second latch bolts movably mounted on the closure panel and having first end portions adapted for respective latching engagement with the keepers upon extension away from one another and unlatching disengagement from the keepers upon retraction toward one another;

first and second locating members mounted on the closure panel and respectively engageable with the first and second keepers to locate the closure panel longitudinally and transversely of the roof opening and transversely align the latch bolts with the keepers, said locating members being longitudinally adjustable on the closure panel to adjust the longitudinal position of the closure panel;

first and second adjusting members mounted on the closure panel and respectively guiding the extension and retraction movement of the first and second latch bolts, said adjusting members being vertically adjustable to vertically align the latch bolts with the keepers;

first and second operating levers having first ends pivotally mounted on the closure panel for movement about spaced axes and having second ends respectively pivotally connected with second end portions of the first and second latch bolts to extend and retract the latch bolts upon rotation of the operating levers;

means for rotating one of the levers;

intermeshing gear teeth provided on the first and second operating levers to simultaneously rotate the second lever with the first lever, the levers rotating oppositely of each other between a latching position wherein the levers are located generally colinear with each other and with the latch bolts to effect extension of the latch bolts and latching engagement thereof with the respective keepers, and an unlatching position wherein the levers are located generally parallel to one another and normal to their respective latch bolts to effect retraction of the latch bolts and unlatching disengagement thereof from the respective keepers;

and detent spring means engaging at least one of the operating levers in the latching position to maintain said latched position of the operating levers and being yieldable to permit movement of the operating levers to the unlatcing positions.

3. A latch mechanism for securing a removable roof closure panel in a vehicle body roof opening comprising:

first and second keepers mounted on the vehicle body at opposite sides of the roof opening;

first and second latch bolts movably mounted on the closure panel and having first end portions adapted for respective latching engagement with the keepers upon extension away from one another and unlatching disengagement from the keepers upon retraction toward one another;

first and second locating members mounted on the closure panel and respectively engageable with the first and second keepers to locate the closure panel longitudinally and transversely of the roof opening and transversely align the latch bolts with the keepers, said locating members being longitudinally adjustable on the closure panel to adjust the longitudinal position of the closure panel;

first and second operating levers having first ends pivotally mounted on the closure panel for movement about spaced axes and having second ends respectively pivotally connected with second end portions of the first and second latch bolts to extend and retract the latch bolts upon rotation of the operating levers;

means for rotating the first operating lever;

intermeshing gear teeth provided on the first and second operating levers to rotate the second operating lever in the opposite direction of the first operating lever;

first and second mating pairs of abutment faces on said first and second operating levers disposed at 90° relative one another to limit opposite rotation between latching positions wherein the levers are located generally colinear with each other and with the latch bolts to effect extension of the latch bolts and latching engagement thereof with the respective keepers, and unlatching positions wherein the levers are located generally parallel to one another and normal to their respective latch bolts to effect retraction of the latch bolts and unlatching disengagement thereof from the respective keepers.

4. A latch mechanism for adjustably securing a removable roof closure panel against vertical, transverse and longitudinal movement in a vehicle body roof opening comprising:

first and second keepers adjustably mounted on the vehicle body at opposite sides of the roof opening for transverse adjusting movement;

first and second latch bolts mounted for longitudinal movement on the closure panel and having first end portions adapted for respective latching engagement with the keepers upon extension away from one another and unlatching disengagement from the keepers upon retraction toward one another;

first and second locating members mounted on the closure panel and respectively engageable with the first and second keepers to locate the closure panel longitudinally and transversely of the roof opening and transversely align the latch bolts with the transversely adjusted keepers, said locating members being longitudinally adjustable on the closure panel to adjust the longitudinal position of the closure panel;

first and second adjusting members mounted on the closure panel and respectively guiding the extension and retraction movement of the first and second latch bolts, said adjusting members being vertically adjustable to vertically align the latch bolts with the keepers;

first and second operating levers having first ends pivotally mounted on the closure panel for movement about spaced axes and having second ends respectively pivotally connected with second end portions of the first and second latch bolts to extend and retract the latch bolts upon rotation of the operating levers;

means for rotating one of the levers;

and intermeshing gear teeth provided on the first and second operating levers to simultaneously rotate the second lever with the first lever, the levers rotating oppositely of each other between a latching position wherein the levers are located generally colinear with each other and with the latch bolts to effect extension of the latch bolts and latching engagement thereof with the respective keepers, and an unlatching position wherein the levers are located generally parallel to one another and normal to a respective latch bolt to effect retraction of the latch bolts and unlatching disengagement thereof from the respective keepers.

* * * * *

UNITED STATES PATENT AND TRADEMARK OFFICE
CERTIFICATE OF CORRECTION

PATENT NO. : 4,193,618
DATED : March 18, 1980
INVENTOR(S) : Charles H. Lee
Harry H. Fetters It is certified that error appears in the above-identified patent and that said Letters Patent are hereby corrected as shown below:

Delete Abstract and substitute therefor -- A latch mechanism for securing a removable closure panel in a vehicle body roof opening includes first and second keepers mounted on the vehicle body at the opposite sides of the roof opening. First and second operating levers are pivotally mounted on the closure panel for movement about spaced axes and are respectively pivotally connected with first and second latch bolts having interengaging gear teeth which rotate the operating levers through 90° of rotation oppositely of each other between latching positions wherein the operating levers are positioned generally colinear with each other and the latch bolts to effect extension of the latch bolts into engagement with the keepers and unlatching positions wherein the operating levers are located generally parallel to one another and normal to the latch bolts. The keepers are mounted for transverse adjusting movement to align with the latch bolts. The latch bolts are vertically aligned with the keepers by vertically adjustable plates on the closure panel. Locating hook members are mounted on the closure panel and engageable with the keepers to transversely align the latch bolts with the keepers and are longitudinally adjustable to adjust the longitudinal location of the closure panel in the vehicle body roof opening. --

UNITED STATES PATENT AND TRADEMARK OFFICE
CERTIFICATE OF CORRECTION

PATENT NO. : 4,193,618
DATED : March 18, 1980
INVENTOR(S) : Charles H. Lee
Harry H. Fetters It is certified that error appears in the above-identified patent and that said Letters Patent are hereby corrected as shown below:

Column 1, line 34, "as" should read -- of --.
Column 3, line 48, "case" should read -- cast --.
Column 4, line 3, "kepers" should read -- keepers --.
Column 5, line 34, "of" should read -- or --.

Signed and Sealed this

Fifteenth Day of July 1980

[SEAL]

Attest:

SIDNEY A. DIAMOND

Attesting Officer

Commissioner of Patents and Trademarks